United States Patent
De Rege Thesauro

(10) Patent No.: US 6,677,266 B1
(45) Date of Patent: Jan. 13, 2004

(54) PROCESS FOR PREPARING A VANADIUM/TITANIUM CATALYST AND USE IN OLEFIN POLYMERIZATION

(75) Inventor: Francesco De Rege Thesauro, Naperville, IL (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 10/191,096

(22) Filed: Jul. 9, 2002

(51) Int. Cl.$^7$ ................................................. B01J 31/36
(52) U.S. Cl. ....................... 502/113; 502/126; 502/104; 502/115; 502/125; 526/124.3; 526/169.2; 526/116; 526/129; 526/123.1; 526/348
(58) Field of Search ................................ 502/113, 126, 502/104, 115, 125; 526/124.3, 169.2, 116, 129, 123.1, 348

(56) References Cited

U.S. PATENT DOCUMENTS

| | | |
|---|---|---|
| 3,113,115 A | 12/1963 | Ziegler et al. |
| 3,462,399 A | 8/1969 | Matthews |
| 3,594,330 A | 7/1971 | Delbouille et al. |
| 3,644,318 A | 2/1972 | Diedrich et al. |
| 3,674,766 A | 7/1972 | Mottus et al. |
| 3,676,415 A | 7/1972 | Diedrich et al. |
| 3,723,348 A | 3/1973 | Apotheker et al. |
| 3,899,477 A | 8/1975 | Altemore et al. |
| 3,917,575 A | 11/1975 | Matsuura et al. |
| 3,956,255 A | 5/1976 | Ort |
| 4,105,847 A | 8/1978 | Ito et al. |
| 4,148,754 A | 4/1979 | Strobel et al. |
| 4,199,475 A | 4/1980 | Welch et al. |
| 4,232,140 A | 11/1980 | Ort |
| 4,256,866 A | 3/1981 | Karayannis et al. |
| 4,298,713 A | 11/1981 | Morita et al. |
| 4,311,752 A | 1/1982 | Diedrich et al. |
| 4,330,646 A | 5/1982 | Sakurai et al. |
| 4,330,647 A | 5/1982 | Sakurai et al. |
| 4,333,851 A | 6/1982 | Speakman et al. |
| 4,335,229 A | 6/1982 | Sakurai et al. |
| 4,363,904 A | 12/1982 | Fraser et al. |
| 4,383,939 A | 5/1983 | Johnstone |
| 4,471,066 A | 9/1984 | Sakurai et al. |
| 4,481,301 A | 11/1984 | Nowlin et al. |
| 4,506,029 A | 3/1985 | Band |
| 4,508,842 A | 4/1985 | Beran et al. |
| 4,537,869 A | 8/1985 | McDaniel |
| 4,578,374 A | 3/1986 | Best |
| 4,612,300 A | 9/1986 | Coleman, III |
| 4,677,087 A | 6/1987 | Lo et al. |
| 4,812,432 A | 3/1989 | Zoeckler et al. |
| 4,814,314 A | 3/1989 | Matsuura et al. |
| 4,831,000 A | 5/1989 | Miro |
| 4,831,090 A | 5/1989 | Bachl et al. |
| 4,912,074 A | 3/1990 | Miro |
| 5,006,499 A | 4/1991 | Daire |
| 5,006,618 A | 4/1991 | Miro |
| 5,013,701 A | 5/1991 | Coosmans et al. |
| 5,034,483 A | 7/1991 | Miro et al. |
| RE33,683 E | 9/1991 | Allen et al. |
| 5,051,388 A | 9/1991 | Buehler et al. |
| 5,059,570 A | 10/1991 | Bailly et al. |
| 5,075,271 A | 12/1991 | Miro |
| 5,106,805 A | 4/1992 | Bailly et al. |
| 5,143,881 A | 9/1992 | Bueschges et al. |
| 5,143,882 A | 9/1992 | Bueschges et al. |
| 5,188,998 A | 2/1993 | Bueschges et al. |
| 5,227,354 A | 7/1993 | Karayannis et al. |
| 5,231,151 A | 7/1993 | Spencer et al. |
| 5,420,090 A | 5/1995 | Spencer et al. |
| 5,442,018 A | 8/1995 | Cann et al. |
| 5,487,938 A | 1/1996 | Spencer et al. |
| 5,691,264 A | 11/1997 | Sacchetti et al. |
| 6,084,042 A | 7/2000 | Jaber et al. |

FOREIGN PATENT DOCUMENTS

EP 0 286 001 * 10/1988

OTHER PUBLICATIONS

"Chemical and Engineering News" 63(5), 27, 1985. Groups numbered 1 to 18.

R. Spitz, V. Pasquet, M. Patin, A. Guyot; The Activation of Supported Vanadium Catalysts in Ethylene Polymerization; Ziegler Catalysts, 1995, pp. 401–411.

Kevin J. Cann; Organohalide Promotion of Vanadium Catalysts for Ethylene Polymerization; Polymer Material Science and Engineering, 1991, No. 64, pp. 106–107.

Y.Ma, D. Reardon, S. Gambarotta, G. Yap, H. Zahalka, C. Lemay; Vanadium–Catalyzed Ethylene–Propylene Copolymerization: The Question of the Metal Oxidation State in Ziegler–Natta Polymerization Promoted by (B–diketonate)3V; Organometallics, 1999, No. 18, pp. 2773–2781.

M.K. Reinking, P.D.Bauer, J.W. Seyler; A Study of Halocarbon Promoter Influence on Catalyst Reactivity and Polymer Mn in Vanadium–Based Ethylene Polymerizations; Applied Cata. A., 1999, No. 189, pp. 23–24.

M. Bialek, K. Czaja; The Effect of the Comonomer on the Copolymerization of Ethylene with Long Chain x–olefins using Ziegler–Natta Catalysts Supported on MgCI2(THF)2; Polymer, 2000, No. 41, pp. 7899–7904.

T. Dall'Occo, M. Galimberti, G. Balbontin; Ethylene/Propylene Copolymers with Vanadium–based Catalysts: Cocatalyst Effect; Polymers for Advanced Technologies, 1993, vol. 4, pp. 429–434.

G.G. Evans, E.M.J. Pijpers, R.H.M. Seevens; Enhancements of the Activity of a Vanadium Catalyst for Ethylene Propylene Copolymerisation; Transition Metal Catalyzed Polymerizations (Proc. Int. Symp.), 1988, pp. 782–798.

* cited by examiner

*Primary Examiner*—Ling-Siu Choi
(74) *Attorney, Agent, or Firm*—Charles R. Richard; Jonathan D. Wood; Bernard J. Graves, Jr.

(57) ABSTRACT

There are described a process for preparing catalyst components comprising vanadium, titanium, electron donor and magnesium chloride, supported or unsupported; catalyst systems incorporating the catalyst components; and the use of the catalyst systems in olefin polymerizations and interpolymerizations.

12 Claims, No Drawings

PROCESS FOR PREPARING A VANADIUM/TITANIUM CATALYST AND USE IN OLEFIN POLYMERIZATION

FIELD OF THE INVENTION

This invention relates to a process for preparing a catalyst component that is useful for olefin polymerization or interpolymerization. In particular the catalyst component comprises magnesium, titanium, vanadium compounds and an electron donor.

BACKGROUND OF THE INVENTION

Many catalysts are known for producing polyolefins having desired properties. Mixed metal catalysts of varying transition metals are used in producing polyolefins. In particular the use of mixed metal catalysts containing vanadium and titanium catalysts have been described in patents for such purpose. For example such patents include U.S. Pat. Nos. 6,084,042; 5,691,264; 5,442,018; 5,420,090; 5,231,151; 5,227,354; 5,106,805; 5,075,271; 5,059,570; 5,034,483; 5,013,701; 5,006,618; 5,006,499; 4,912,074; 4,831,000; 4,814,314; 4,612,300; 4,537,869; 4,506,029; and 4,471,066. The patents describe various types of catalysts and use of the catalysts for preparing polyolefins having various properties.

SUMMARY OF THE INVENTION

A process for preparing a catalyst component comprising titanium, vanadium, magnesium chloride and at least one electron donor (ED), both supported and unsupported. The process for preparing the catalyst component comprises contacting magnesium chloride with a vanadium compound containing at least one electron donor thereby yielding a product that is thereafter contacted with a titanium compound, wherein the amounts of the magnesium, titanium and vanadium are specifically defined. The resulting catalyst component, with a cocatalyst, provides a catalyst system suitable for the polymerization or interpolymerization of olefins.

DETAILED DESCRIPTION OF THE INVENTION

A process for preparing a catalyst component comprising titanium, vanadium, magnesium chloride and at least one electron donor (ED), both supported and unsupported. The process for preparing the catalyst component comprises contacting magnesium chloride with a vanadium compound containing at least one electron donor thereby yielding a product that is thereafter contacted with a titanium compound, wherein the amounts of the magnesium, titanium and vanadium are specifically defined. The resulting catalyst component, with a cocatalyst, provides a catalyst system suitable for the polymerization or interpolymerization of olefins.

All mention herein to elements of Groups of the Periodic Table are made in reference to the Periodic Table of the Elements, as published in "Chemical and Engineering News", 63(5), 27, 1985. In this format, the Groups are numbered 1 to 18.

In the process for preparing the catalyst component, any magnesium chloride may be used. It has been found that the magnesium chloride may be utilized in the form of magnesium chloride supported on silica such as Sylopol 5550 support obtainable from Grace-Davison. Sylopol 5550 support is described as magnesium chloride supported on silica, containing 3.53 wt % magnesium and a molar ratio of chlorine to magnesium of 2.02.

In the present process there is used a vanadium compound containing at least one electron donor. The vanadium compounds that are usable herein are selected from $OVX_m(OR)_{3-m}(ED)_s$; $OVX_m(NR_2)_{3-m}(ED)_s$; $VX_n(OR)_{4-n}(ED)_s$; $VX_n(NR_2)_{4-n}(ED)_s$; $[V_3O(RCO_2)_6]_2 \cdot [V_2O_2X_6(ED)_s]$; $[V(CO)_3(ED)_s] \cdot [V(CO)_6]$; $M[V(bipy)_2] \cdot (ED)_s$; $M_3[V(C_2O_4)_3] \cdot (ED)_s$; $M[VOX_4] \cdot (ED)_s$; $V_3O(RCO_2)_6(ED)_s$; $O_{3-p}VR'_p(ED)_s$; $VX_mR'_{3-m}(ED)_s$; $VX_2 \cdot (ED)_s$; $OVX_qR'_r(ED)_s$ wherein m is 0 to 3, n is 0 to 4, p is 1 to 3, q is 0 to 2, r is 0 to 2, q is not equal to r, s is greater than 0, preferably s is from about 0.1 to about 3, X is independently fluorine, chlorine, bromine or iodine, R is independently a $C_1$–$C_{18}$ acyclic or cyclic hydrocarbon radical, ED is an electron donor, M is a cation of lithium, sodium, potassium or cesium ($Li^+$, $Na^+$, $K^+$ or $Cs^+$), bipy is 2,2'-bipyridine and R' is a monoanionic bidentate ligand.

With respect to the above described vanadium compounds containing at least one electron donor, suitable for use as acyclic or cyclic radicals (R) are $C_{1-18}$ alkyl, $C_{2-18}$ alkenyl, $C_{4-18}$ dienyl, $C_{3-18}$ cycloalkyl, $C_{3-18}$ cycloalkenyl, $C_{4-18}$ cyclodienyl, $C_{6-18}$ aryl, $C_{7-18}$ aralkyl, and $C_{7-18}$ alkaryl.

Further with respect to the above described vanadium compounds containing at least one electron donor, the electron donors suitable for use herein include carboxylic acid esters, anhydrides, acid halides, ethers, alcohols, thiols, thioethers, aldehydes, ketones, imines, amines, amides; nitrites, isonitriles, cyanates, isocyanates, thiocyanates, isothiocyanates, thioesters, dithioesters, carbonic esters, hydrocarbyl carbamates, hydrocarbyl thiocarbamates, urethanes, sulfoxides, sulfones, sulfonamides, organosilicon compounds containing at least one oxygen atom, and nitrogen, phosphorous, arsenic or antimony compounds connected to an organic group through a carbon or oxygen atom. More preferred as electron donors are compounds containing from 1 to 50 carbon atoms and from 1 to 30 heteroatoms of an element, or mixtures thereof, selected from Groups 14, 15, 16 and 17 of the Periodic Table of Elements. Most preferred for use is an ether such as tetrahydrofuran.

Further with respect to the above described vanadium compounds containing at least one electron donor, suitable for use herein as the monoanionic bidentate ligand (R') are the Lewis bases of the following compounds which contain acidic hydrogen; carboxylic acids, carboxylic acid amides, carboxylic acid phosphides, thiocarboxylic acids, dithiocarboxylic acids, thiocarboxylic acid amides, thiocarboxylic acid phosphides, carbonic acid, carbamamic acids, ureas, thiocarbonic acid, thioureas, thiocarbamamic acids, dithiocarbamic acids, hydroxycarboxylic esters, hydroxycarboxylic acid amides, amino acid esters, hydroxythiocarboxylic esters, hydroxydithiocarboxylic esters, hydroxythiocaboxylic acid amides, hydroxycarboxylic thioesters, hydroythiocarboxylic thioesters, hydroxydithiocarboxylic thioesters, mercaptocarboxylic esters, mercaptocarboxylic acid amides, mercaptothiocarboxylic esters, mercaptodithiocarboxylic esters, mercaptothiocarboxylic acid amides, mercaptocarboxylic thioesters, mercaptothiocarboxylic thioesters, mercaptodithiocarboxylic thioesters, hydroxyketones, hydroxyaldehydes, hydroxyimines, mercaptoketones, mercaptoaldehydes, mereaptoimines, hydroxythioketones, hydroxythioaldehydes, mercaptothioketones, mercaptothioaldehydes, 2-hydroxybenzaldehydes, 2-mercaptobenzaldehydes, 2-aminobenzaldehydes, 2-hydroxybenzthioaldehydes, 2-hydroxybenzoate esters, 2-hydroxybenzamides, 2-hydroxybenzoate thioesters, 2-hydroxythiobenzoate esters, 2-hydroxythiobenzamides, 2-hydroxybenzthioaldehydes, 2-mercaptobenzthioaldhydes, 2-aminobenzthioaldehydes, 2-hydroxyarylketones, 2-mercaptoarylketones, 2-aminoarylketones, 2-hydroxyarylimines, 2-mercaptoarylimines, 2-aminoarylimines, 2-hydroxyarylthioketones, 2-mercaptoarylthioketones, 2-aminoarylthioketones, benzoins, 2-pyrrolecarboxaldehydes, 2-pyrrolethiocarboxyaldehydes, 2-pyrrolecarboxaldimines, hydrocarbyl 2-pyrrolyl ketones, hydrocarbyl 2-pyrrolylimines, hydrocarbyl 2-pyrrolyl thioketones, 2-indolecarboxaldehydes, 2-indolethiocarboxaldehydes, 2-indolecarboxaldimines, hydrocarbyl 2-indolyl ketones, hydrocarbyl 2-indolyl imines, hydrocarbyl 2-indolyl thioketones, hydroxyquinolines, tropolones, aminotropolones, aminotropone imines, and the like.

Preferred for use herein as the vanadium compound containing an electron donor are $VCl_3 \cdot zTHF$ (z=2–3), $VOCl_3 \cdot THF$, and $VOF_3 \cdot THF$.

The vanadium compounds containing at least one electron donor may be prepared by any method known in the art. For example, a vanadium compound may be dissolved in excess electron donor and the excess electron donor subsequently removed.

In the present process the titanium compound is selected from $TiX_a(OR)_{4-a}$; $TiX_a(NR_2)_{4-a}$; $Ti(NR_2)_{4-a}R'_a$; $TiX_{4-a}R'_a$; $Ti(OR)_{4-a}R'_a$; $OTiR'_2$; $TiX_b(ED)_c$; $H_2TiX_6$; $(Bpy_3)TiX_3$; wherein X is independently fluorine, chlorine, bromine or iodine; R is independently a $C_1$–$C_{18}$ acyclic or cyclic hydrocarbon radical; R' is independently a monoanionic bidentate ligand; a is 0 to 4; b is an integer greater than 0, preferably 1 to 100; c is an integer greater than 0, preferably 1 to 100; ED is an electron donor; $Bpy_3$ is trispyrazole borate.

With respect to the above described titanium compounds, suitable for use as acyclic or cyclic radicals (R) are $C_{1-18}$ alkyl, $C_{2-18}$ alkenyl, $C_{4-18}$ dienyl, $C_{3-18}$ cycloalkyl, $C_{3-18}$ cycloalkenyl, $C_{4-18}$ cyclodienyl, $C_{6-18}$ aryl, $C_{7-18}$ and $C_{7-18}$ alkaryl.

Further, with respect to the above described titanium compounds suitable for use herein as the monoanionic bidentate ligand (R') are the Lewis bases of the following compounds which contain acidic hydrogen; carboxylic acids, carboxylic acid amides, carboxylic acid phosphides, thiocarboxylic acids, dithiocarboxylic acids, thiocarboxylic acid amides, thiocarboxylic acid phosphides, carbonic acid, carbamamic acids, ureas, thiocarbonic acid, thioureas, thiocarbamamic acids, dithiocarbamic acids, hydroxycarboxylic esters, hydroxycarboxylic acid amides, amino acid esters, hydroxythiocarboxylic esters, hydroxydithiocarboxylic esters, hydroxythiocaboxylic acid amides, hydroxycarboxylic thioesters, hydroythiocarboxylic thioesters, hydroxydithiocarboxylic thioesters, mercaptocarboxylic esters, mercaptocarboxylic acid amides, mercaptothiocarboxylic esters, mercaptodithiocarboxylic esters, mercaptothiocarboxylic acid amides, mercaptocarboxylic thioesters, mercaptothiocarboxylic thioesters, mercaptodithiocarboxylic thioesters, hydroxyketones, hydroxyaldehydes, hydroxyimines, mercaptoketones, mercaptoaldehydes, mercaptoimines, hydroxythioketones, hydroxythioaldehydes, mercaptothioketones, mercaptothioaldehydes, 2-hydroxybenzaldehydes, 2-mercaptobenzaldehydes, 2-aminobenzaldehydes, 2-hydroxybenzthioaldehydes, 2-hydroxybenzoate esters, 2-hydroxybenzamides, 2-hydroxybenzoate thioesters, 2-hydroxythiobenzoate esters, 2-hydroxythiobenzamides, 2-hydroxybenzthioaldehydes, 2-mercaptobenzthioaldhydes, 2-aminobenzthioaldehydes, 2-hydroxyarylketones, 2-mercaptoarylketones, 2-aminoarylketones, 2-hydroxyarylimines, 2-mercaptoarylimines, 2-aminoarylimines, 2-hydroxyarylthioketones, 2-mercaptoarylthioketones, 2-aminoarylthioketones, benzoins, 2-pyrrolecarboxaldehydes, 2-pyrrolethiocarboxyaldehydes, 2-pyrrolecarboxaldimines, hydrocarbyl 2-pyrrolyl ketones, hydrocarbyl 2-pyrrolylimines, hydrocarbyl 2-pyrrolyl thioketones, 2-indolecarboxaldehydes, 2-indolethiocarboxaldehydes, 2-indolecarboxaldimines, hydrocarbyl 2-indolyl ketones, hydrocarbyl 2-indolyl imines, hydrocarbyl 2-indolyl thioketones, hydroxyquinolines, tropolones, aminotropolones, aminotropone imines, and the like.

Further, with respect to the above described titanium compounds, the electron donors suitable for use herein include carboxylic acid esters, anhydrides, acid halides, ethers, alcohols, thiols, thioethers, aldehydes, ketones, imines, amines, amides, nitriles, isonitriles, cyanates, isocyanates, thiocyanates, isothiocyanates, thioesters, dithioesters, carbonic esters, hydrocarbyl carbamates, hydrocarbyl thiocarbamates, urethanes, sulfoxides, sulfones, sulfonamides, organosilicon compounds containing at least one oxygen atom, and nitrogen, phosphorous, arsenic or antimony compounds connected to an organic group through a carbon or oxygen atom. More preferred as electron donors are compounds containing from 1 to 50 carbon atoms and from 1 to 30 heteroatoms of an element, or mixtures thereof, selected from Groups 14, 15, 16 and 17 of the Periodic Table of Elements. Exemplary titanium compounds suitable for use herein include, $TiCl_4$, $TiBr_4$, $TiI_4$, $TiF_4$, $TiCl_3$, $TiF_3$, $Ti(OC_2H_5)Cl_3$, $Ti(OC_2H_5)_2Cl_2$, $Ti(OC_2H_5)_3Cl$, $Ti(O-iC_3H_7)Cl_3$, $Ti(O-n-C_4H_9)Cl_3$, $Ti(O-n-C_4H_9)_2Cl_2$, $Ti(OC_2H_5)Br_3$, $Ti(OC_2H_5)_2(OC_4H_9)Cl$, $Ti(OC_6H_5)Cl_3$, $Ti(O-i-C_4H_9)Cl_3$, $Ti(OC_5H_{11})Cl_3$, $Ti(OC_6H_{13})Cl_3$, $Ti(OC_2H_5)_4$, $Ti(O-n-C_3H_7)_4$, $Ti(O-i-C_3H_7)_4$, $Ti(O-n-C_4H_9)_4$, $Ti(O-i-C_4H_9)_4$, $Ti(O-n-C_6H_{13})_4$, $Ti(O-n-C_8H_{17})_4$, $Ti(OCH_2CH(C_2H_5)C_4H_9)_4$, Bis(2,2,6,6tetramethyl-3,5-heptanedionato)oxotitanium, Dichlorobis(2,2,6,6-teramethyl-3,5-heptanedionato titanium, Di(i-propoxide)bis(2,2,6,6-tetramethyl-3,5-heptanedionato)titanium(IV), hexafluorotitanic acid, Hydrotris(1-pyrazolylborato)trichlorotitaium(IV), tetrachlorobis(cyclohexylmercapto)titanium(IV), tetrachlorodiamminotitanium(IV), tetrachlorobis(tetrahydrofuran)titanium(IV), tetrakis(diethylamino)titanium, tetrakis(dimethylamino)titanium, titanium (IV) t-butoxide, titanium (di-ipropoxide)bis(acetylacetonate), titanium hydride, titanium (IV) oxide bis(acetylacetonate), trichlorotris(tetrahydrofuran)titanium(III), tris(2,2,6,6tetramethyl-3,5-heptanedionato)titanium (III).

The preferred titanium compound is (2,6-Di-tert-butyl-4-methylphenoxy)titanium(IV) trichloride [(BHT')TiCl₃].

The titanium compounds to be used herein, may be prepared by any method known in the art.

In the present process the quantities of magnesium, vanadium and titanium are as follows. The molar ratio of magnesium to vanadium ranges from about 2:1 to about 100:1. Preferably the molar ratio of magnesium to vanadium ranges from about 7:1 to about 80:1. Most preferably the molar ratio of magnesium to vanadium ranges from about 10:1 to about 40:1. The molar ratio of magnesium to titanium ranges from about 2:1 to about 100:1. Preferably the molar ratio of magnesium to titanium ranges from about 7:1 to about 80:1. Most preferably the molar ratio of magnesium to titanium ranges from about 10:1 to about 40:1. The molar ratio of titanium to vanadium ranges from about 0.1:1 to about 10:1. Preferably the molar ratio of titanium to vanadium ranges from about 0.2:1 to about 5:1. Most preferably the molar ratio of titanium to vanadium ranges from about 0.3:1 to about 3:1.

The catalyst component of the present process may be used either supported or unsupported. When used in a supported manner, any inorganic or organic support may be used.

Examples of suitable inorganic supports include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Supports containing at least one component selected from the group consisting of $SiO_2$ and $Al_2O_3$ or mixtures thereof as a main component are preferred.

Examples of suitable organic supports include polymers such as, for example, polyethylene, polypropylene, interpolymers of ethylene and alpha-olefins, polystyrene, functionalized polystyrene, polyamides and polyesters.

In further detail, the present process is carried out in the following manner. The process is preferably carried out in an inert atmosphere. The magnesium chloride, preferably on a silica support, is contacted with a vanadium compound containing at least one electron donor. The magnesium chloride may be used as a dry powder, or fluidized with a stream of inert gas or preferably suspended in an inert solvent. Preferably, the magnesium chloride is contacted with the vanadium compound containing one or more electron donors at a temperature ranging from about −100° C. to about 100° C., more preferably, from about 20° C. to about 60° C. The vanadium compound containing at least one electron donor, when contacted with the magnesium chloride, may be used in any form such as dissolved or suspended in an inert solvent or used in the vapor, liquid or solid form. Preferably, the vanadium compound containing one or more electron donors is dissolved in an inert solvent prior to contacting the magnesium chloride. The magnesium chloride and vanadium compound containing at least one electron donor are mixed until there is obtained a product having a molar ratio of magnesium to vanadium ranging from about 2:1 to about 100:1. The resulting vanadium compound containing at least one electron donor and magnesium chloride, may be used in any form such as a dry powder, or fluidized with a stream of inert gas or preferably suspended in an inert solvent.

The resultant vanadium compound containing at least one electron donor and magnesium chloride, is then contacted with a titanium compound. Preferably the vanadium compound containing at least one electron donor and magnesium chloride, is contacted with the titanium compound at a temperature ranging from about −100° C. to about 100° C., more preferably from about 20° C. to about 60° C. The titanium compound, when contacted with the vanadium compound containing at least one electron donor and magnesium chloride, may be used in any form such as dissolved or suspended in an inert solvent or used in the vapor, liquid or solid form. Preferably, the titanium compound is dissolved in an inert solvent prior to contacting the vanadium compound containing at least one electron donor and magnesium chloride. The vanadium compound containing at least one electron donor and magnesium chloride, is mixed with the titanium compound until there is obtained a product having a molar ratio of magnesium to titanium ranging from about 2:1 to about 100:1. The resulting product comprises magnesium chloride, vanadium, electron donor and titanium wherein the molar ratio of magnesium to vanadium is about 2:1 to about 100:1, the molar ratio of magnesium to titanium is from about 2:1 to about 100:1, and the molar ratio of titanium to vanadium is from about 0.1:1 to about 10:1. The resulting product may be used in any form.

Any inert solvent may be used in the present process. For example, saturated hydrocarbon such as pentane, hexane, heptane and the like are useful. Aromatic hydrocarbons such as benzene, toluene and xylenes may also be used. Halogenated hydrocarbons such as dichloromethane, 1,2-dichloroethane, trichlorofluoromethane and the like are also useful.

The present invention also provides a catalyst system comprising (A) at least one catalyst component prepared as described above, and (B) (B) at least one cocatalyst The molar ratio of the cocatalyst to the titanium in the catalyst component is from about 0.1 to about 1000. Preferably, the molar ratio of the cocatalyst to the titanium in the catalyst component is from about 5 to about 800.

The cocatalyst used with the catalyst component made by the process of this invention can be any organometallic compound, or mixtures thereof, that can activate the catalyst component in the polymerization of olefins. In particular, the cocatalyst that is reacted with the catalyst component contains a metal of Groups 1, 2, 11, 12, 13 and/or 14 of the above described Periodic Table of the Elements. Exemplary of such metals are lithium, magnesium, copper, zinc, boron, silicon and the like, and mixtures thereof.

Preferably the cocatalyst is at least one compound of the formula, $X_tER"_{3-t}$ or mixtures thereof, wherein X is independently hydrogen or a halogen selected from fluorine, chlorine, bromine and iodine; t ranges from 0 to 2; E is an element from Group 13 of the Periodic Table of Elements such as boron, aluminum and gallium; R" is a hydrocarbon group, containing from 1 to 100 carbon atoms and from 0 to 10 oxygen atoms, connected to E (the Group 13 element) by a carbon or oxygen bond.

Exemplary of the R" groups suitable for use herein are $C_{1-100}$ alkyl, $C_{1-100}$ alkoxy, $C_{2-100}$ alkenyl, $C_{4-100}$ dienyl, $C_{3-100}$ cycloalkyl, $C_{3-100}$ cycloalkoxy, $C_{3-100}$ cycloalkenyl, $C_{4-100}$ cyclodienyl, $C_{6-100}$ aryl, $C_{7-100}$ aralkyl, $C_{7-100}$ aralkoxy and $C_{7-100}$ alkaryl. Also exemplary of R" are the hydrocarbon groups containing from 1 to 100 carbon atoms and from 1 to 10 oxygen atoms.

Exemplary of the cocatalyst that may be used with the catalyst component in preparing the catalyst systems of the present invention where t=0 are trimethylaluminum; triethylborane; triethylgallane; triethylaluminum; tri-n-propylaluminum; tri-n-butylaluminum; tri-n-pentylaluminum; triisoprenylaluminum; tri-n- hexylaluminum; tri-n-heptylaluminum; tri-n-octylaluminum; triisopropylaluminum; diisobutylaluminum; tris(cylcohexylmethyl)aluminum; dimethylaluminum methoxide; dimethylaluminum ethoxide; diethylaluminum ethoxide and the like. Exemplary of compounds where t=1 are dimethylaluminum chloride; diethylaluminum chloride; di-n-propylaluminum chloride; di-n-butylaluminum chloride; di-n-pentylaluminum chloride; diisoprenylaluminum chloride; di-n-hexylaluminum chloride; di-n-heptylaluminum chloride; di-n-octylaluminum chloride; diisopropylaluminum chloride; diisobutylaluminum chloride; bis(cylcohexylmethyl) aluminum chloride; diethylaluminum fluoride; diethylaluminum bromide; diethylaluminum iodide; dimethylaluminum hydride; diethylaluminum hydride; di-n-propylaluminum hydride; di-n-butylaluminum hydride; di-n-pentylaluminum hydride; diisoprenylaluminum hydride; di-n-hexylaluminum hydride; di-n-heptylaluminum hydride; di-n-octylaluminum hydride; diisopropylaluminum hydride; diisobutylaluminum hydride; bis(cylcohexylmethyl) aluminum hydride; chloromethylaluminum methoxide; chloromethylaluminum ethoxide; chloroethylaluminum ethoxide and the like. Exemplary of compounds where t=2 are methylaluminum dichloride; ethylaluminum dichloride; n-propylaluminum dichloride; n-butylaluminum dichloride; n-pentylaluminum dichloride; isoprenylaluminum dichloride; n-hexylaluminum dichloride; n-heptylaluminum dichloride; n-octylaluminum dichloride; isopropylaluminum dichloride; isobutylaluminum dichloride; (cylcohexylmethyl)aluminum dichloride and the like. Also exemplary are alkylaluminum sesquialkoxides such as methylaluminum sesquimethoxide; ethylaluminum sesquiethoxide; n-butylaluminum sesquinbutoxide and the like. Also exemplary are alkylaluminum sesquihalides such as methylaluminum sesquichloride; ethylaluminum sesquichloride; isobutylaluminum sesquichloride; ethylaluminum sesquifluoride; ethylaluminum sesquibromide; ethylaluminum sesquiiodide and the like.

Preferred for use herein as cocatalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, tri-n-decylaluminum; and dialkylaluminum halides such as dimethylaluminum chloride, diethylaluminum chloride, dibutylaluminum chloride; diisobutylaluminum chloride, diethylaluminum bromide and diethylaluminum iodide; and alkylaluminum sesquihalides such as methylaluminum sesquichloride, ethylaluminum sesquichloride, n-butylaluminum sesquichloride, isobutylaluminum sesquichloride, ethylaluminum sesquifluoride, ethylaluminum sesquibromide and ethylaluminum, sesquiiodide.

Most preferred for use herein as cocatalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum and dialkylaluminum halides such as dimethylaluminum chloride, diethylaluminum chloride, dibutylaluminum chloride, diisobutylaluminum chloride and alkylaluminum sesquihalides such as methylaluminum sesquichloride, ethylaluminum sesquichloride, n-butylaluminum sesquichloride and isobutylaluminum sesquichloride.

Mixtures of compounds of the above formula $X_tER3-_t$ also can be utilized herein as the cocatalyst.

In a further aspect of the invention, there is provided a process for polymerizing or interpolymerizing olefins using the catalyst systems of the invention, which comprise a catalyst component and a cocatalyst set forth herein.

Preferably, the present invention provides a process for polymerizing ethylene and/or interpolymerizing ethylene and at least one or more other olefin(s) comprising contacting under polymerization conditions, the ethylene and/or ethylene and at least one or more olefin(s) with the catalyst system of the present invention. The olefins, for example, may contain from 2 to 16 carbon atoms. Included herein are homopolymers, copolymers, terpolymers, and the like of the olefin monomeric units. Particularly preferred for preparation herein by the process of the present invention are polyethylenes. Such polyethylenes are defined as homopolymers of ethylene and interpolymers of ethylene and at least one alphaolefin wherein the ethylene content is at least about 50% by weight of the total monomers involved. Exemplary alpha-olefins that may be utilized herein are propylene, 1-butene, 1-pentene, 1-hexene, 1-heptene, 1-octene, 4-methyl-1-pentene, 1-decene, 1-dodecene, 1-hexadecene and the like. Also utilizable herein are polyenes such as 1,3-hexadiene, 1,4-hexadiene, 1,5-hexadiene, cyclopentadiene, dicyclopentadiene, 4-vinylcyclohex-1-ene, 1,5-cyclooctadiene, 5-vinylidene-2norbornene, 5-vinyl-2-norbornene, and olefins formed in situ in the polymerization medium. When olefins are formed in situ in the polymerization medium, the formation of polyethylenes containing long chain branching may occur. Mixtures of olefins may be used herein.

The polymerization or interpolymerization process of the present invention may be carried out using any conventional process. For example, there may be utilized polymerization or interpolymerization in suspension, in solution, in super critical fluid or in gas phase media. All of these polymerization or interpolymerization processes are well known in the art.

Any additive used in polymerization processes may be utilized in the present polymerization processes. For example there may be incorporated external electron donors and/or molecular weight control agents such as hydrogen. Further, in the polymerization process there can be introduced any compound that increases the activity of the catalyst system such as halogenated hydrocarbons, oxygen, peroxides, hydroperoxides, quinones, ceric salts, cobalt(III) salts, stannic salts, calcium carbonate, organic nitrates, nitrites, azoxy compounds, organic polyvalent iodine compounds, organometallic complexes in a high valence state, alkyl disulfides and inorganic nitrogen-oxygen compounds. Still further, in the polymerization process there can be introduced any additive that lowers the molecular weight distribution of the resulting polymer, lowers the melting point of the resulting polymer, lowers the hexane extractables of the resulting polymer and/or lowers the static in the polymerization reactor. The olefin polymers or interpolymers of the present invention may be fabricated into films by any technique known in the art. For example, films may be produced by the well-known cast film, blown film and extrusion coating techniques.

Further, the olefin polymers or interpolymers may be fabricated into other articles of manufacture, such as molded articles, by any of the well-known techniques.

In the process of the invention, the catalyst component, cocatalyst or catalyst system can be introduced in any manner known in the art. For example, the catalyst component can be introduced directly into the polymerization or interpolymerization medium in the form of a slurry or dry free flowing powder. The catalyst component can also be used in the form of a prepolymer obtained by contacting the catalyst component with one or more olefins in the presence of a cocatalyst.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyolefins or catalyst component herein.

a) Density is determined according to ASTM D-1505-85 using a polyethylene strand made in accordance with ASTM-2839.

b) Melt Index (MI), $I_2$, is determined in accord with ASTM D-1238, condition E, measured at 190° C., and reported as decigrams per minute;

c) High Load Melt Index (HLMI), $I_{21}$, is measured in accord with ASTM D-1238, Condition F, measured at 10.0 times the weight used in the melt index test above;

d) Melt Flow Ratio (MFR)=$I_{21}$, $I_2$ or High Load Melt Index/Melt Index;

e) DSC Melt Transition Temperature ($T_m$) was determined according to ASTM D-3418-97. The Melt Transition Temperature, $T_m$ was measured on the second heat cycle; and f) Elemental analysis was determined by Inductively Coupled Plasma (ICP). There was used a Perkin Elmer model #5100 Inductively Coupled Plasma Spectrometer. The samples of catalyst components prepared in the glovebox described below (examples 4–6) were transferred in a sealed vial from the glove box to a Labconco 506500 nitrogen filled flush box. About 50 to about 100 mg of the sample was weighed into a platinum crucible. The sample in the platinum crucible was brought out of the flush box. About 1 to about 2 mL of concentrated hydrochloric acid was added to the sample which was heated at about 80° C. until the sample dissolved (15–20 minutes). The dissolved sample was then diluted with deionized water (ASTM D-1193, TypeI) to 50 mL. VGH Multi Element Plasma Standard, Custom Multi B in 20% Hydrochloric Acid was used as the standard for calibration of the ICP. The diluted sample and the standard were separately fed to the ICP torch using the peristaltic pump of the instrument. A spectrometer reading on the standard was obtained. The system was flushed with 20% hydrochloric acid. A spectrometer reading on the standard was then obtained. The accuracy of this method was determined by conducting 38 analyses of the standard over a period of ten weeks on the instrument. For titanium the precision of measurement was determined to be 4.976 ppm and standard deviation was determined to be 0.056. For vanadium 15 the precision was determined to be 5.066 ppm and standard deviation was determined to be 0.041. The amount of metal was calculated as follows;

$$\text{ppm Metal} = \frac{(\text{Spectrometer reading})(\text{dilution})}{\text{Sample Weight}}$$

Examples 1–17 were conducted in a Vacuum Atmospheres He493 glove box. Heptane, toluene and tetrahydrofuran were purified by passage through a bed of 3 A activated alumina molecular sieves followed by passage through a bed of R311 copper catalyst (available from BASF) under about 172 MPa (25 psi) nitrogen pressure prior to entering the glove box. Methylene chloride was purified by passage through a bed of 3 A activated molecular sieves under about 172 MPa (25 psi) nitrogen pressure prior to entering the glove box. Solvents were introduced into the glove box using 0.3175 cm (⅛ inch) steel tubing terminated with ball valves. All other reagents were obtained from commercial sources and used as received.

In carrying out the polymerizations of examples 18–31 there was used a nitrogen-filled Vacuum Atmospheres PC-1 glove box. Heptane and hexene were purified by passage through a bed of 3 A activated alumina molecular sieves followed by passage through a bed of R-311 copper catalyst. Ethylene and hydrogen were purified by passage through a bed of R-311 copper catalyst prior to entering the glove box. Solvents and gases were introduced into the glove box using 0.3175 cm (⅛ inch) steel tubing terminated with ball valves. There was utilized a 500 mL Fisher-Porter aerosol reaction vessel. This is a bottle-type design using a rubber to glass sealing head. Installation of the reactor head provides a seal which will safely hold 700 MPa. Heat was applied using 2.5 cm heating tape wrapped around a stainless steel protective wire mesh screen. A thermocouple in the Fisher-Porter bottle was used to monitor the temperature during the polymerization. The temperature was controlled by a J-KEM Scientific Model 210 temperature controller. Gas or liquid monomers were added through a multi-port addition head as desired. Pressures were maintained at the source prior to addition into the vessel.

Polymers produced by the process of the invention were recovered by blending with acetone and then collecting the precipitated polymer by filtration. The polymer was,washed with excess acetone and dried in a vacuum oven at 50° C.

In each of the examples where polymerization was carried out, the nuns were performed at least in duplicate.

In examples 1–3 there were prepared materials utilized in the preparation of the catalyst components of the present invention.

Example 1

In example 1 there was prepared (BHT')TiCl₃. A flask was charged with 0.220 g (1 mmol) of butylated-hydroxytoluene (BHT). Thereafter the BHT was dissolved in 3.5 mL of heptane. A separate flask was charged with 5 mL of heptane and 0.190 g (1 mmol) of TiCl4 and stirred. The BHT solution was added to the stirred solution of TiCl4. The resulting solution was stirred for 30 minutes. The heptane was removed under vacuum. There was obtained 0.337 g of (BHT')TiCl₃.

Example 2

In example 2 there was prepared VOCl₃.THF. Two (2.000 g) of VOCl₃ were dissolved in 50 mL of heptane in a flask. Thereafter 5 mL of tetrahydrofuran (THF) were added to the solution. The resulting solution was stirred for 5 minutes and then the heptane was removed under vacuum. There was obtained 1.770 g of VOCl₃.THF.

Example 3

In example 3 there was prepared $VOF_3.THF$. One gram of $VOF_3$ was added to 30 mL of THF in a flask. The resulting solution was filtered through diatomaceous earth material and the excess THF was removed under vacuum. There was obtained 1.500 g of VOF3.THF.

In the following examples 4–17, there were prepared examples of catalyst components of the present invention. Utilized in examples 4–17, was Sylopol 5550 support (sold by Grace-Davison), which is a magnesium chloride on silica support, containing 3.53 wt % magnesium and a chlorine to magnesium ratio of 2.02:1.

Example 4

A flask was charged with 80 mL of methylene chloride and 0.100 g of $VCl3.zTHF$ (z=2–3). The resulting solution was stirred until the vanadium complex was dissolved. Thereafter 2.000 g of Sylopol 5550 support was added with stirring to the solution. The resulting mixture was stirred for 1 hour and the solids were collected by vacuum filtration on a fritted glass funnel. The solids were washed with methylene chloride until the washings were colorless. Methylene chloride was removed from the solids by vacuum. There was obtained 1.960 g of a supported vanadium compound.

0.500 g of the supported vanadium compound from above was slurried by stirring in 50 mL of heptane. A solution of 0.018 g (BHT')$TiCl_3$ as prepared in example 1, in 10 mL heptane was added to the stirred slurry. The resulting mixture was stirred for 1 hour. The mixture was vacuum filtered using a fritted glass funnel and the solids were washed with heptane until the washings were colorless. Heptane was removed from the solids under vacuum. There was obtained 0.520 g of a catalyst component comprising 0.63 wt % vanadium (by ICP), 0.26 wt % titanium (by ICP), THF, 3.53 wt % magnesium and silica support. By calculation the catalyst component is determined to have a molar ratio of magnesium to vanadium of 11.74:1; a molar ratio of magnesium to titanium of 26.76:1; and a molar ratio of titanium to vanadium of 0.44:1.

Example 5

The procedure of example 4 was followed except that 0.035 g of (BHT')$TiCl_3$ was used. There was obtained 0.685 g of a catalyst component comprising 0.62 wt % vanadium (by ICP), 0.42 wt % titanium(by ICP), THF, 3.53 wt % magnesium and silica support. By calculation the catalyst component is determined to have a molar ratio of magnesium to vanadium of 11.93:1; a molar ratio of magnesium to titanium of 16.56:1; and a molar ratio of titanium to vanadium of 0.72:1.

Example 6

The procedure of example 4 was followed except that 0.009 g of (BHT')$TiCl_3$ was used. There was obtained 0.485 g of a catalyst component comprising 0.26 wt % vanadium (by ICP), 0.72 wt % titanium (by ICP), THF, 3.53 wt % magnesium and silica support. By calculation the catalyst component is determined to have a molar ratio of magnesium to vanadium of 10.28:1; a molar ratio of magnesium to titanium of 26.76:1; and a molar ratio of titanium to vanadium of 0.38:1.

Example 7

The procedure of example 4 was followed except that 0.025 g of $VCl_3.zTHF$ (z=2–3) was used. There was obtained 0.480 g of a catalyst component comprising 0.22 wt % vanadium (by ICP), 0.36 wt % titanium (by ICP), THF, 3.53 wt % magnesium and silica support. By calculation the catalyst component was determined to have a molar ratio of magnesium to vanadium of 33.63:1; a molar 19 ratio of magnesium to titanium of 19.32:1; and a molar ratio of titanium to vanadium of 1.74:1.

Example 8

A flask was charge with 2.000 g of Sylopol 5550 support and 50 mL of methylene chloride and stirred. To this mixture was added a solution of 0.050 g $VOF_3.THF$ as prepared in example 3, in 10 mL, of methylene chloride. The resulting mixture was stirred for 1 hour and vacuum filtered using a fritted glass funnel. The solids obtained from the filtration were washed with methylene chloride until the washings were colorless. Methylene chloride was removed from the solids under vacuum. There was obtained a supported vanadium compound.

0.500 g of the supported vanadium compound from above was slurried by stirring in 50 mL of heptane. A solution of 0.01 8 g (BHT')$TiCl_3$ as prepared in example 1, in 10 mL heptane, was added to the stirred slurry. The resulting mixture was stirred for 1 hour. The mixture was vacuum filtered using a fritted glass funnel and the solids were washed with heptane until the washings were colorless. Heptane was removed from the solids under vacuum. There was obtained 0.469 g of a catalyst component comprising 0.50 wt % vanadium (by ICP), 0.38 wt % titanium (by ICP), THF, 3.53 wt % magnesium and silica support. By calculation the catalyst component was determined to have a molar ratio of magnesium to vanadium of 14.80:1; a molar ratio of magnesium to titanium of 18.31:1; and a molar ratio of titanium to vanadium of 0.81:1.

Example 9

The procedure of example 8 was followed with the following differences: 5.000 g of Sylopol 5550 support was used; 250 mL, of methylene chloride was used; 0.125 g of $VOF_3.THF$ was used and 0.0358 of (BHT')$TiCl_3$ was used. There was obtained 0.471 g of a catalyst component comprising 0.75 wt % vanadium (by ICP), 0.43 wt % titanium (by ICP), THF, 3.53 wt % magnesium and silica support. By calculation the catalyst component was determined to have a molar ratio of magnesium to vanadium of 9.86:1; a molar ratio of magnesium to titanium of 16.18:1; and a molar ratio of titanium to vanadium of 0.61:1.

Example 10

The procedure of example 8 was followed with the following differences: 5.000 g of Sylopol 5550 support was used; 250 ml, of methylene chloride was used; 0.125 g of $VOF_3.THF$ was used and 0.009 g of (BHT')$TiCl_3$ was used. There was obtained 0.522 g of a catalyst component comprising 0.50 wt % vanadium (by ICP), 0.18 wt % titanium (by ICP), THF, 3.53 wt % magnesium and silica support. By calculation the catalyst component was determined to have a molar ratio of magnesium to vanadium of 14.80:1; a molar ratio of magnesium to titanium of 38.65:1; and a molar ratio of titanium to vanadium of 0.38:1.

Example 11

The procedure of example 8 was followed except that 0.750 g of $VOF_3.THF$ was used. There was obtained a catalyst component comprising 0.45 wt % vanadium (by ICP), 0.26 wt % titanium (by ICP), THF, 3.53 wt % magnesium and silica support. By calculation the catalyst component was determined to have a molar ratio of magnesium to vanadium of 16.44:1; a molar ratio of magnesium to titanium of 26.76:1; and a molar ratio of titanium to vanadium of 0.61:1.

Example 12

The procedure of example 8 was followed except that 0.025 g of $VOF_3$.THF was used. There was obtained a catalyst component comprising 0.30 wt % vanadium (by ICP), 0.38 wt % titanium (by ICP), THF, 3;53 wt % magnesium and silica support. By calculation the catalyst component was determined to have a molar ratio of magnesium to vanadium of 24.66:1; a molar ratio of magnesium to titanium of 18.31:1; and a molar ratio of titanium to vanadium of 1.35:1.

Example 13

A flask was charged with 2.000 g of Sylopol 5550 support and 50 mL of methylene chloride, and stirred. To the resulting mixture was added a solution of 0.050 g $VOCl_3$.THF prepared as in example 2, in 5 mL of methylene chloride. The resulting mixture was stirred for 1 hour and vacuum filtered using a fritted glass funnel. The solids were washed with methylene chloride until the washings were colorless. Methylene chloride was removed from the solids under vacuum. There was obtained a supported vanadium compound.

0.500 g of the supported vanadium compound from above was slurried by stirring in 50 mL of heptane. A solution of 0.018 g $(BHT')TiCl_3$, produced as in example 1, in 10 mL heptane was added to the stirred slurry. The resulting mixture was stirred for 1 hour. The mixture was vacuum filtered using a fritted glass funnel. The solids were washed with heptane until the washings were colorless. Heptane was removed from the solids under vacuum. There was obtained 0.503 g of a catalyst component comprising 0.36 wt % vanadium (by ICP), 0.39 wt % titanium (by ICP), THF, 3.53 wt % magnesium and silica support. By calculation the catalyst component was determined to have a molar ratio of magnesium to vanadium of 20.55:1; a molar ratio of magnesium to titanium of 17.84:1; and a molar ratio of titanium to vanadium of 1.15:1.

Example 14

The procedure of example 13 was followed except that 0.035 g $(BHT')TiCl_3$ was used. There was obtained 0.302 g of a catalyst component comprising 0.30 wt % vanadium (by ICP), 0.78 wt % titanium (by ICP), THF, 3.53 wt % magnesium and silica support. By calculation the catalyst component was determined to have a molar ratio of magnesium to vanadium of 24.66:1; a molar ratio of magnesium to titanium of 8.92:1; and a molar ratio of titanium to vanadium of 2.77:1.

Example 15

The procedure of example 13 was followed except that 0.009 g $(BHT')TiCl_3$ was used. There was obtained 0.460 g of a catalyst component comprising 0.36 wt % vanadium (by ICP), 0.24 wt % titanium (by ICP), THF, 3.53 wt % magnesium and silica support. By calculation the catalyst component was determined to have a molar ratio of magnesium to vanadium of 20.55:1; a molar ratio of magnesium to titanium of 28.99:1; and a molar ratio of titanium to vanadium of 0.71:1.

Example 16

The procedure of example 13 was followed except that 0.075 g $VOCl_3$.THF was used. There was obtained a catalyst component comprising 0.51 wt % vanadium (by ICP), 0.61 wt % titanium (by ICP), THF, 3:.53 wt % magnesium and silica support. By calculation the catalyst component was determined to have a magnesium to vanadium molar ratio of 14.51:1; a molar ratio of magnesium to titanium of 11.40:1; and a molar ratio of titanium to vanadium of 1.27:1.

Example 17

The procedure of example 13 was followed except that 0.025 g $VOCl_3$.THF was used. There was obtained a catalyst component comprising 0.23 wt % vanadium (by ICP), 0.41 wt % titanium (by ICP), THF, 3.53 wt % magnesium and silica support. By calculation the catalyst component was determined to have a molar ratio of magnesium to vanadium of 32.17:1; a molar ratio of magnesium to titanium of 16.97:1; and a molar ratio of titanium to vanadium of 1.90:1.

In the following examples 18–31, there are shown the results of carrying out polymerization processes utilizing the catalyst components of examples 4–17. The apparatus used for carrying out the polymerization processes of examples 18–31, has been described herein.

The process utilized in carrying out examples 18–31, was identical except for the catalyst component used. The process was as follows. The Fisher-Porter bottle was charged with 100 mL heptane and the heptane was stirred. There was added 0.022 g of trimethyl aluminum co-catalyst to the Fisher-Porter bottle containing the heptane that was being stirred. There was added 0.020 g of catalyst component to the stirred contents of the Fisher-Porter bottle. The Fisher-Porter bottle was sealed using the rubber to glass sealing head. The contents were heated with stirring until a temperature of about 90° C. was reached. The Fisher-Porter bottle was vented to the glove box atmosphere. 55 MPa (8 psi) hydrogen pressure was added. 15 mL of hexene was added using ethylene pressure, resulting in a total pressure of about 662 MPa (96 psi). This pressure was maintained for one hour by a continuous ethylene feed. Stirring is maintained throughout the polymerization. After one hour the Fisher-Porter bottle was vented to the glove box atmosphere. The heating and stirring were also stopped. The Fisher-Porter bottle was removed from the glove box and the resultant polymer was recovered as described above.

Details concerning the polymers produced in examples 18–21 are reported in Table 1. Details concerning the polymers produced in examples 22–26 are reported in Table 2. Details concerning the polymers produced in examples 27–31 are reported in Table 3.

TABLE 1

| Example Number | Catalyst Component of Example Number | Activity (Kg/gTi) | MI (dg/min) | MFR | Density (g/cc) | $T_m$ (° C.) |
|---|---|---|---|---|---|---|
| 18 | 4 | 180 | 0.544 | 25.9 | 0.9260 | 124.64 |
| 18 | 4 | 162 | 0.732 | 22.2 | 0.9267 | 124.61 |
| 18 | 4 | 165 | 0.456 | 22.2 | 0.9265 | 124.61 |
| 19 | 5 | 197 | 1.981 | 28.2 | 0.9193 | 122.45 |
| 19 | 5 | 239 | 1.750 | 28.3 | 0.9200 | 122.73 |
| 19 | 5 | 186 | 2.010 | 28.4 | 0.9207 | 122.73 |
| 20 | 6 | 229 | 1.704 | 30.5 | 0.9203 | 122.61 |
| 20 | 6 | 291 | 1.681 | 28.6 | 0.9192 | 122.28 |

TABLE 1-continued

| Example Number | Catalyst Component of Example Number | Activity (Kg/gTi) | MI (dg/min) | MFR | Density (g/cc) | $T_m$ (°C.) |
|---|---|---|---|---|---|---|
| 20 | 6 | 260 | 1.619 | 28.2 | 0.9187 | 122.36 |
| 21 | 7 | 264 | 2.97 | 25.5 | 0.9211 | 123.06 |
| 21 | 7 | 245 | 1.883 | 26.2 | 0.9206 | 122.69 |
| 21 | 7 | 241 | 1.708 | 27.1 | 0.9206 | 122.67 |

TABLE 2

| Example Number | Catalyst Component of Example Number | Activity (Kg/gTi) | MI (dg/min) | MFR | Density (g/cc) | $T_m$ (°C.) |
|---|---|---|---|---|---|---|
| 22 | 8 | 105 | 0.567 | 22.4 | 0.9305 | 125.09 |
| 22 | 8 | 71 | 0.430 | 20.7 | 0.9327 | 125.19 |
| 22 | 8 | 89 | 0.802 | 20.9 | 0.9306 | 124.94 |
| 23 | 9 | 244 | 2.640 | 27.4 | 0.9221 | 123.35 |
| 23 | 9 | 237 | 2.290 | 28.2 | 0.9219 | 123.84 |
| 23 | 9 | 218 | 2.150 | 28.1 | 0.9222 | 123.5 |
| 24 | 10 | 275 | 2.400 | 31.4 | 0.9211 | 122.69 |
| 24 | 10 | 294 | 2.720 | 31.9 | 0.9201 | 123.02 |
| 24 | 10 | 256 | 2.070 | 33 | 0.9205 | 122.98 |
| 25 | 11 | 97 | 1.188 | 33.7 | 0.9245 | 123.10 |
| 25 | 11 | 179 | 1.235 | 34.2 | 0.9222 | 123.07 |
| 25 | 11 | 146 | 1.349 | 31.3 | 0.9223 | 123.36 |
| 26 | 12 | 231 | 1.711 | 26.9 | 0.9215 | 122.95 |
| 26 | 12 | 245 | 2.290 | 27.1 | 0.9218 | 123.44 |
| 26 | 12 | 198 | 1.231 | 27 | 0.9223 | 123.25 |

TABLE 3

| Example Number | Catalyst Component of Example Number | Activity (Kg/gTi) | MI (dg/min) | MFR | Density (g/cc) | $T_m$ (°C.) |
|---|---|---|---|---|---|---|
| 27 | 13 | 138 | 0.766 | 20.2 | 0.9259 | 124.82 |
| 27 | 13 | 157 | 1.723 | 20.9 | 0.9257 | 124.87 |
| 27 | 13 | 195 | 0.991 | 19.67 | 0.9252 | 125.04 |
| 28 | 14 | 119 | 1.861 | 26.2 | 0.9219 | 123.61 |
| 28 | 14 | 132 | 2.170 | 27.5 | 0.9193 | 122.92 |
| 28 | 14 | 119 | 2.580 | 25.2 | 0.9201 | 123.16 |
| 29 | 15 | 174 | 2.330 | 30.2 | 0.9203 | 122.25 |
| 29 | 15 | 244 | 2.080 | 28.1 | 0.9196 | 122.30 |
| 29 | 15 | 268 | 2.050 | 29.9 | 0.9200 | 122.26 |
| 30 | 16 | 153 | 2.910 | 28.0 | 0.9180 | 122.15 |
| 30 | 16 | 162 | 1.731 | 27.6 | 0.9192 | 122.51 |
| 30 | 16 | 157 | 3.580 | 27.6 | 0.9164 | 122.56 |
| 31 | 17 | 223 | 1.773 | 27.0 | 0.9203 | 122.83 |
| 31 | 17 | 180 | 1.388 | 26.7 | 0.9201 | 122.54 |

From the data in Tables 1 to 3, it is observed that ethylene copolymers with varied MI, MFR and density can be obtained utilizing the catalyst components of this invention.

It should be clearly understood that the forms of the invention herein described are illustrative only and are not intended to limit the scope of the invention. The present invention includes all modifications falling within the scope of the following claims.

I claim:

1. A process for preparing a catalyst component comprising:

A) contacting magnesium chloride with a vanadium compound containing at least one electron donor wherein the vanadium compound is selected from the group consisting of $OVX_m(OR)_{3m}(ED)_s$; $OVX_m(NR_2)_{3-m}(ED)_s$; $VX_n(OR)_{4-n}(ED)_s$; $VX_n(NR_2)_{4-n}(ED)_s$; $[V_3O(RCO_2)_6]_2$·$[V_2O_2X_6(ED)_s]$; $[V(CO)_3(ED)_s]$·$[V(CO)_6]$; $M[V(bipy)_2]$·$(ED)_s$; $M_3[V(C_2O_4)_3]$·$(ED)_s$; $V_3O(RCO_2)_6(ED)_s$; $O_{3-p}VP'_p(ED)_s$; $VX_mR'_{3-m}(ED)_s$; $VX_2$·$(ED)_s$; $OVX_qR'_r(ED)_s$ wherein m is 0 to 3, n is 0 to 4, p is 1 to 3, q is 0 to 2, r is 0 to 2, q is not equal to r, s is greater than 0, X is independently fluorine, chlorine, bromine or iodine, R is independently a $C_1-C_{18}$ acyclic or cyclic hydrocarbon radical, ED is an electron donor, M is the cation of lithium, sodium, potassium or cesium, bipy is 2,2'-bipyridine, and R' is a monoanionic bidentate ligand, to produce a product, and B) contacting the product with a titanium compound selected from the group consisting of $TiX_a(OR)_{4-a}$; $TiX_a(NR_2)_{4-a}$; $Ti(NR_2)_{4-a}R'_a$; $TiX_{4-a}R'_a$; $Ti(OR)_{4-a}R'_a$; $OTiR'_2$; $TiX_b(ED)_c$; $H_2TiX_6$; $(Bpy_3)TiX_3$; wherein X is independently fluorine, chlorine, bromine or iodine, R is independently a $C_1-C_{18}$ acyclic or cyclic hydrocarbon radical, R' is independently a monoanionic bidentate ligand, a is 0 to 4, b is an integer greater than 0, c is an integer greater than 0, ED is an electron donor, and $Bpy_3$ is trispyrazole borate, wherein the molar ratio of magnesium to vanadium ranges from about 2:1 to about 100:1, the molar ratio of magnesium to titanium ranges from about 2:1 to about 100:1, and the molar ratio of titanium to vanadium ranges from about 0.1:1 to about 10:1.

2. The process according to claim 1 wherein the vanadium compound containing at least one electron donor is selected from the group consisting of $VCl_3$·zTHF (z=2–3), $VOCl_3$·THF, and $VOF_3$·THF.

3. The process according to claim 1 wherein the titanium compound is (2,6Di-tert-butyl-4-methylphenoxy)titanium (IV) trichloride.

4. The process according to claim 1 wherein the vanadium compound containing at least one electron donor contains an ether as the electron donor.

5. The process according to claim 4 wherein the electron donor is tetrahydrofuran.

6. The process according to claim 1 wherein s is from about 0.1 to about 3.

7. The process according to claim 1 wherein b is an integer from 1 to 100 and c is an integer from 1 to 100.

8. The process according to claim 1 wherein the molar ratio of magnesium to vanadium ranges from about 7:1 to about 80:1, the molar ratio of magnesium to titanium ranges from about 7:1 to about 80:1, and the molar ratio of titanium to vanadium ranges from about 0.2:1 to about 5:1.

9. The process according to claim 1 wherein the catalyst component is supported on a support.

10. The process according to claim 9 wherein the support is selected from the group consisting of silica, alumina or mixtures.

11. The process according to claim 1 wherein the magnesium chloride is supported on a support prior to contacting the vanadium compound containing at least one electron donor.

12. The process according to claim 11 wherein the magnesium chloride is supported on silica.

* * * * *

UNITED STATES PATENT AND TRADEMARK OFFICE
CERTIFICATE OF CORRECTION

PATENT NO.    : 6,677,266 B1
DATED         : January 13, 2004
INVENTOR(S)   : De Rege Thesauro It is certified that error appears in the above-identified patent and that said Letters Patent is hereby corrected as shown below:

Column 16,
Line 7, after "$M_3[V(C_2O_4)_3]\cdot(ED)_s;$" -- $M[VOX_4]\cdot(ED)_s;$ -- should be inserted.
Line 9, "$OVX_gR'_r(ED)_s$" should be -- $OVX_qR'_r(ED)_s$ --
Line 37, "(2,6Di-tert-butyl-4-methylphenoxy)" should be
-- (2,6-Di-tert-butyl-4-methylphenoxy) --

Signed and Sealed this

Thirteenth Day of April, 2004

JON W. DUDAS
*Acting Director of the United States Patent and Trademark Office*